Dec. 26, 1961     R. J. J. WALTHERY     3,014,370
HEAT-UNIT METER
Filed Feb. 11, 1959
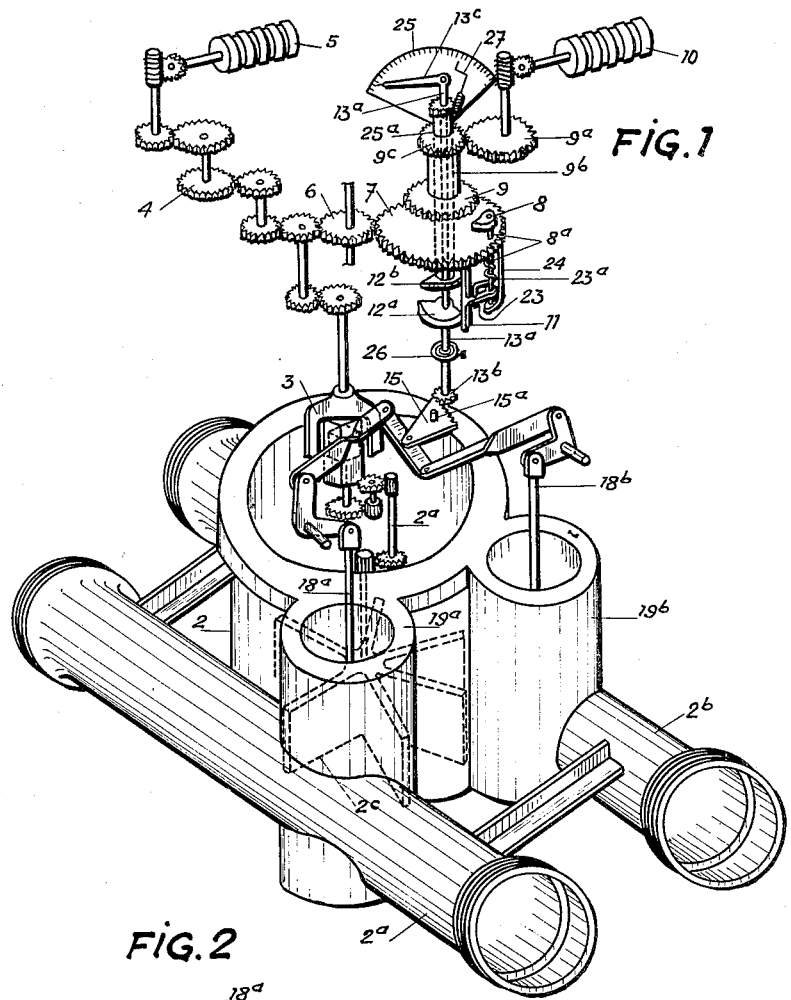
FIG.1
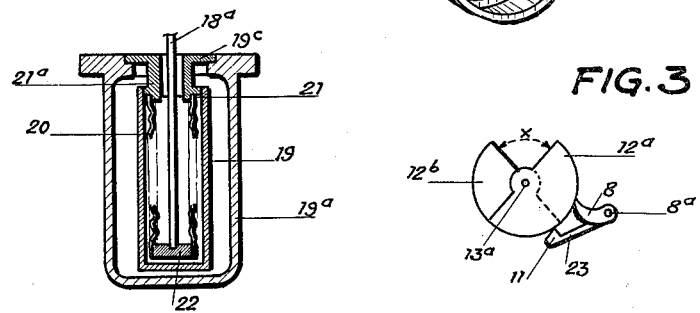
FIG.2
FIG.3

3,014,370
HEAT-UNIT METER
Robert Jules Jean Walthery, Ans, Belgium
(3 Rue Joseph Servais, Ans Lez Liege, Belgium)
Filed Feb. 11, 1959, Ser. No. 792,644
Claims priority, application Belgium Feb. 24, 1958
1 Claim. (Cl. 73—193)

Meters for measuring thermal units are employed industrially and privately for the purpose of indicating the number of units of heat utilized during a given time in a circuit in which a heating fluid has circulated.

Heat-unit meters of various kinds are already known. Thus for example heat-unit meters are known in which meters measuring the quantity of fluid are combined with thermo-electric elements measuring the difference between the temperature at admission to the circuit and the temperature at discharge therefrom. These appliances are complicated and costly. Heat-unit meters are also known which comprise heat-sensitive elements consisting of bi-metallic strips which act upon the integrating system. In these appliances the resistances due to friction are generally high, which renders them not very strong, and not very exact for measuring small differences of temperature. Meters are also known in which the heat-sensitive elements act through the medium of capillary tubes. Appliances of this nature are not very exact on account of the mass of liquid filling the said tubes.

The present invention eliminates the disadvantages of the known heat-unit meters, by providing a piece of apparatus which is distinguished not merely by certain distinctive details but also by certain constructional features which render it simple, accurate and durable.

Although the apparatus according to the invention makes use of certain known elements, it presents a particular arrangement of these elements which results in qualities not attained by existing meters.

An appliance according to the invention is constituted by an assemblage cast in one piece, comprising a casing having a seating for the volumetric meter, and, on each pipe connecting the meter with the utilization circuit, a socket provided with a seating for a heat-sensitive element. This element is formed by a removable plunger containing the expansible liquid, in which is immersed a pleated tube directly controlling a rod actuating the integrating system and a needle indicating the differences of temperature.

The present invention will be more readily understood from the following description of the accompanying drawings, which illustrate one constructional example, and in which details are shown.

FIGURE 1 is a diagrammatic view in perspective of a heat-unit meter; while

FIGURE 2 is a view in axial section through one socket and a plunger; and

FIGURE 3 is a plan view of the cams.

The heat-unit meter illustrated, which is an assemblage cast in one piece, comprises a casing 2, in which there is accommodation for a known water-meter 2c of the tangential type, and two sockets 19a and 19b, provided directly upon the conduits 2a and 2b which unite the meter to the inlet and outlet pipes of the utilization circuit.

By means of a magnetic device diagrammatically indicated at 3, the water-meter 2c drives a series of toothed wheels 4, the last of which actuates a totalizer represented at 5.

In the sockets 19a and 19b are provided cavities connected with the conduits 2a and 2b for the accommodation of the removable heat-sensitive elements, such as the one diagrammatically illustrated in FIGURE 2, which corresponds to the socket 19a. The heat-sensitive element comprises a cylindrical plunger 19, which, in its operative position, will be bathed on its external surface by the fluid flowing through the conduit. The plunger, closed by a plug 21a having a supporting flange 19c, is filled with an expansible liquid, oil for example, after there has been introduced into it a pleated tube 20, which is fixed at its upper end 21 to the said closure plug 21a, and is closed at the bottom by a plug 22, upon which is mounted a rod such as 18a. A rod 18b is carried by a system identical with that which has just been described, lodged in the socket 19b.

The plungers 19 rest by their flanges, such as 19c, upon the sockets 19a and 19b, after the interposition of a fluidtight packing, not shown. They are then held in position by a cover, not shown.

The rods 18a and 18b act simultaneously, through a rod-and-lever assemblage, upon a toothed sector 15, which thus turns upon its shaft 15a through an angle proportional to the difference between the temperatures. More particularly the forces acting on rods 18a and 18b oppose or supplement each other such that a resultant force acts on sector 15.

Meshing with the sector 15 is toothed wheel 13b fixed to a shaft 13a, which carries at its upper end a needle 13c, which moves, in front of a graduated dial 25, through an angle proportional to the temperature difference. Upon the shaft 13a, which is permanently subjected to the action of a spring 26, is mounted a revolving cam 12a, which is of semi-circular form. Above the cam 12a is a fixed cam 12b likewise semi-circular, which is co-axial with the cam 12a. A pawl 8 is mounted upon a revolving shaft 8a, carried by the toothed wheel 7 which also carries bracket 24. An arm 23 terminating in a finger 11, bears against the stationary cam 12b and against the turning cam 12a under the action of spring 23a. When these cams leave between them an angle X (FIGURE 3) proportional to the difference between the temperatures, the finger 11, carried round in the movement of rotation of the wheel 7, which receives its motion from the wheel 6, drops at a given moment into this angle. The shaft 8a then turns, and the pawl 8 engages in the teeth of the wheel 9, which is driven until the finger 11 passes out of angle X; that is to say, the wheel 9 turns proportionally to the difference of temperature and to the volume of fluid that has passed through the utilization circuit. By the shaft 9b which carries it and the wheel 9c, the wheel 9 drives the wheel 9a and the totalizer diagrammatically indicated at 10. It should be noted that the dial 25 and the stationary cam 12b are virtually integral with one and the same hollow shaft 25a. Owing to this mounting, if an angular displacement of the zero reading should occur because of the changes in the characteristic of the heat sensitive element, all that is necessary is to turn the dial on the shaft 25a through the angle necessary for restoring the zero of the dial to its position in front of the needle, in order to re-establish correct operation.

An advantage of a meter according to this invention is that the expansible liquid in the plunger is directly surrounded by the fluid flowing through the conduit. Moreover, the mounting by means of the pleated tube, eliminates conventional capillary tubes, so that auxiliary expansions are avoided. Furthermore, the mounting enables large amplifications which are necessary for precision. Additionally, the control of the zero position is possible. Finally, the construction of the assemblage as a single block is particularly durable and enables connection in a circuit which is simple, since the connection is effected simply upon the inlet and outlet pipes, without requiring any connection of the heat-sensitive plungers.

What I claim is:

A heat-unit meter comprising a casing, a volumetric meter in said casing for measuring the quantity of fluid passing through said heat-unit meter, an inlet pipe adapted for leading to a utilization circuit and an outlet pipe adapted for returning from said circuit, a hollow socket in each of said pipes, a removable cylindrical plunger in each of said hollow sockets and including flanges for resting upon said sockets, a pleated tube fixed at the top of each of said plungers, a plug at the bottom of said pleated tubes for closing the same, a rod on said plugs, an expansible liquid completely filling said plungers, a rod-and-lever assemblage connected to said rods, a toothed sector coupled to and actuated by said assemblage to rotate through an angle proportional to the temperature difference of the fluid in said pipes, a toothed wheel meshing with said sector, a rotating shaft connected to said wheel, a spring acting on said rotating shaft, a first cam fixed on said rotating shaft, said cam being semi-circular, a second normally stationary hollow shaft coaxially disposed with respect to said rotating shaft and rotatable with respect thereto for calibration, a second cam fixed on said stationary shaft, a toothed wheel coaxial with said rotating shaft and moved by said volumetric meter, a revolving shaft and a bracket mounted on said wheel, a pawl and an arm on said revolving shaft, a finger on said arm bearing against said cams which define therebetween an angle proportional to the difference of temperatures, a hollow rotating shaft and a further toothed wheel fixed on said hollow rotating shaft and said pawl engaging in the teeth of said toothed wheel to rotate said hollow rotating shaft with the finger in the angle between said cams, a pinion on said hollow rotating shaft, a totalizer controlled by said pinion to indicate the heat units used by said utilization circuit, a dial on said stationary shaft, and a needle on said rotating shaft positioned in front of said dial to indicate the difference of temperature of the fluid in said pipes.

References Cited in the file of this patent

UNITED STATES PATENTS

| | | |
|---|---|---|
| 606,749 | Wehling | July 5, 1898 |

FOREIGN PATENTS

| | | |
|---|---|---|
| 689,428 | Great Britain | Mar. 25, 1953 |
| 751,518 | Great Britain | June 27, 1956 |
| 1,013,444 | Germany | Aug. 8, 1957 |